United States Patent
Krokosz

(10) Patent No.: US 7,383,268 B2
(45) Date of Patent: Jun. 3, 2008

(54) INDEXING TECHNIQUE FOR AN EFFICIENT BEST-PATTERN MATCHED LOOKUP

(75) Inventor: Matthew Krokosz, Wall, NJ (US)

(73) Assignee: ITXC IP Holdings S.a.r.l., Luxembourg (LU)

( * ) Notice: Subject to any disclaimer, the term of this patent is extended or adjusted under 35 U.S.C. 154(b) by 466 days.

(21) Appl. No.: 10/631,154

(22) Filed: Jul. 31, 2003

(65) Prior Publication Data
US 2005/0027711 A1    Feb. 3, 2005

(51) Int. Cl.
*G06F 7/00* (2006.01)

(52) U.S. Cl. .................... 707/101; 709/219
(58) Field of Classification Search .............. 707/10, 707/3; 379/219, 230
See application file for complete search history.

(56) References Cited

U.S. PATENT DOCUMENTS

| | | | |
|---|---|---|---|
| 6,741,688 B1* | 5/2004 | Yau | 379/142.01 |
| 6,763,017 B1* | 7/2004 | Buckingham et al. | 370/352 |
| 6,957,341 B2* | 10/2005 | Rice et al. | 713/190 |
| 6,987,839 B1* | 1/2006 | Lockwood | 379/88.12 |
| 2004/0018856 A1* | 1/2004 | Park et al. | 455/563 |

* cited by examiner

*Primary Examiner*—Sathyanarayan Pannala
(74) *Attorney, Agent, or Firm*—Kaplan Gilman Gibson & Dernier LLP

(57) ABSTRACT

An indexing system in a database comprises plural levels, each representing one digit in a key of a data string and having an instruction for each constituent element at said represented digit of the key. The instruction includes one of: i) moving on to check a next level without specifying a record; ii) specifying one or more records and also moving on to check a next level; iii) specifying one or more records and not moving on to check a next level; iv) not specifying a record and not moving on to check a next level. A database so indexed facilitates an efficient recursive lookup on a best-pattern match basis, such as required in a telephony database for acquiring fast routing instructions based on a telephone number.

17 Claims, 2 Drawing Sheets

FIG. 2

| KEY | RECORDS |
|---|---|
| 1* | Route to A |
| 12* | Route to B |
| 1555* | Route to C & D |
| 1555403* | Route to E |
| 1555408* | Route to F |

INDEXING TECHNIQUE FOR AN EFFICIENT BEST-PATTERN MATCHED LOOKUP

TECHNICAL FIELD

This invention relates to a method of indexing a database for an efficient best-pattern matching lookup, and in particular, to a method of indexing a telephony database for an efficient lookup for desired call processing instructions, e.g., a routing instruction, based on a telephone number.

BACKGROUND OF THE INVENTION

When a call is received at a call processing center, switching center, or other point of routing, a telephony application often has to make a decision about how to handle the call based on some information related to the call. Often this decision is made based upon a telephone number provided in the call, such as the calling number provided by an automatic number identifier (ANI) or the called number provided by a dialed number identifier service (DNIS). For example, the telephony application may use the ANI to authenticate the caller for the service being provided by the call center, or it may need to look at the DNIS to figure out how or where to route the call. In each of these cases, the telephony application or routing algorithm will need to use the telephone number as a key to perform a database lookup to acquire a routing instruction or other call processing instructions.

In a traditional database, the telephony application may simply query the database for a record that exactly matches the telephone number. Obviously, the time needed to perform such an exact-matched lookup increases with the number of data entries (telephone numbers) in the database, though it may also depend on how efficiently the database indexes the keys which associate a record with a telephone number. Thus, the telephony system will have a trade off between its performance and the scalability of the database application.

Many telephony applications do not require an exact-matched lookup, but rather they require best-pattern matched lookups. For example, a telephony application may only need to find all records for keys which best match an incoming telephone number of "1-555-1007000", such as "1-555" and "1-555-1", but not "1-505". However, a traditional database is not designed for optimal best-pattern matched lookups, and therefore will not provide an efficient means of looking up these records in a single query. The application will usually be burdened with performing many complex queries in order to figure out the best-pattern that matches the given phone number.

Therefore, there exists a need for a method for indexing keys to specified records with an efficient best-pattern matched lookup capability. In particular, there exists a need for a method for indexing a telephony database in a way that supports an efficient best-pattern matched lookup of a routing instruction based on a telephone number.

SUMMARY OF THE INVENTION

According to an aspect of the present invention, an indexing technique for associating a plurality of keys with respective predetermined records is provided. Each of the keys comprises a data string of one or more digits with a plurality of constituent elements each taking one of the digits. In particular, the indexing technique comprises plural levels, each of which represents one digit and having an instruction for each constituent element of the data strings at the represented digit, wherein the instruction includes one of: i) moving on to check a next level without specifying a record; ii) specifying one or more records and also moving on to check a next level; iii) specifying one or more records and not moving on to check a next level; iv) not specifying a record and not moving on to check a next level. A database thus indexed according to the present invention facilitates an efficient best-pattern matched lookup.

In a preferred embodiment, each key represents a group of telephone numbers, and the records are routing instructions to route calls based on the telephone numbers. Preferably, the key is a string of numbers that represents a portion (e.g., starting digits) of every telephone number in the group.

According to another aspect of the present invention, a method is provided for looking up records for a data string query in a database indexed according to the above indexing technique. The method comprises the steps of: i) starting sequentially from a first level of the indexing technique, checking for an instruction for each constituent element of the data string query at each digit represented by each level, and moving on to check a next level until the instruction found at a lastly checked level does not comprise an instruction of moving on to check a next level; and ii) if the instruction found at the lastly checked level specifies one or more records, returning the specified records to the data string query, otherwise backing up one level at a time until an instruction of specifying one or more records is found, and returning the specified records to the data string query.

In this way, the data string query is quickly returned with records specified for a key which best-pattern matches the query.

BRIEF DESCRIPTION OF THE DRAWING

The above and further features and advantages will be clearer from reading of the following detailed description of preferred embodiments of the present invention, with reference of accompany drawing in which:

FIG. 2 is a data table showing keys in a first column and corresponding records in a second column in accordance with an embodiment of the present invention.

DETAILED DESCRIPTION OF THE PREFERRED EMBODIMENTS

Figure 1:
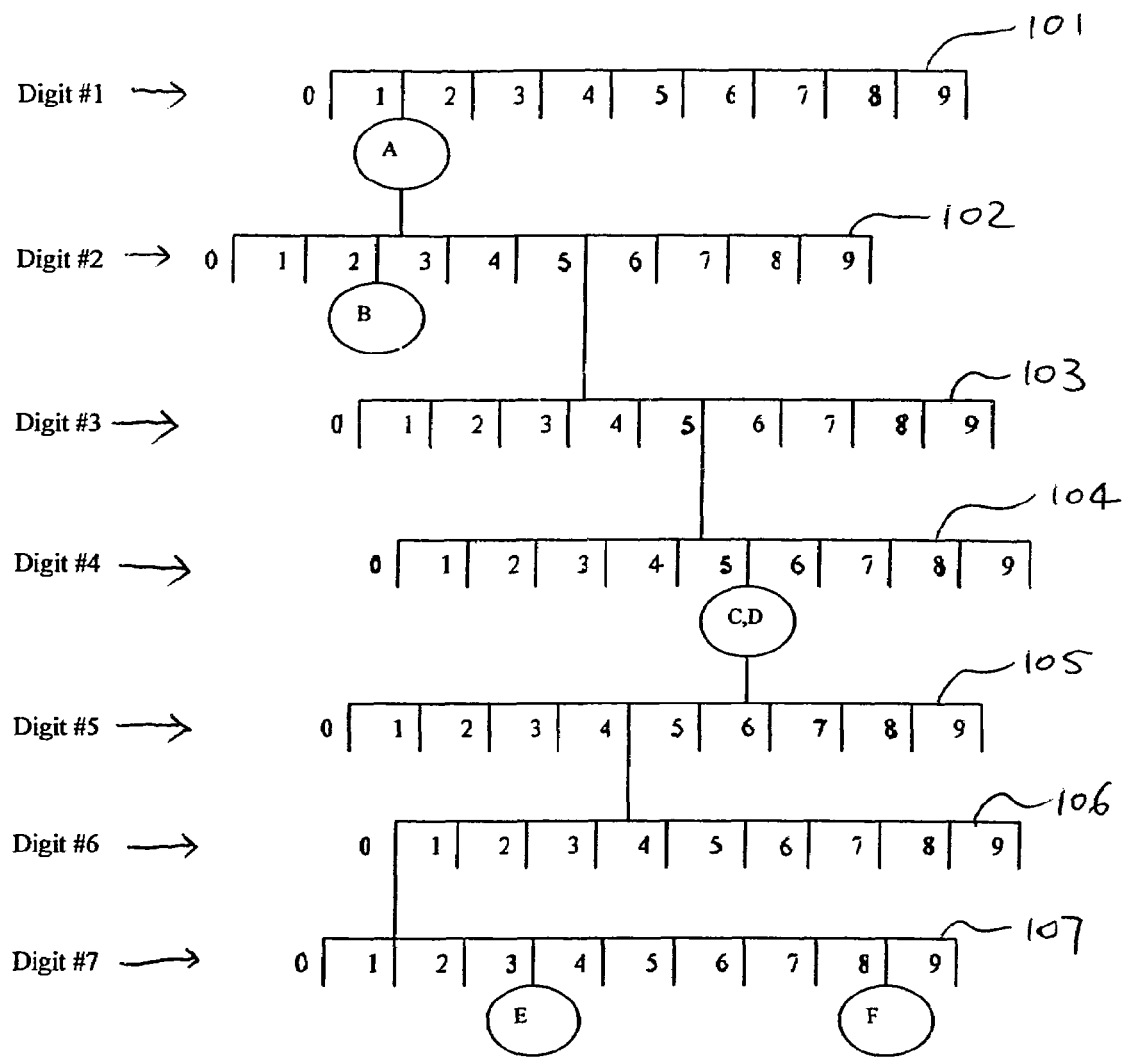
FIG. 1 is a schematic illustration of an embodiment of an indexing technique of the present invention implemented in a telephony database, in which keys represent telephone numbers and records represent routing instructions.

To better understand the present invention, an indexing system for a telephony database is taken as an exemplary embodiment of the present invention. In the telephony database, various routing instructions are assigned to various keys, and each key represents a group of telephone numbers.

Here, a telephone number is an example of a data string of plural digits which comprises a string of constituent elements each taking one digit in the string. The term "constituent element" in this application means a constituent component of a data string which takes a single digit in the data string, such as a number from 0~9 in a telephone number, or a letter from A~Z in a person's name.

Assume a telephony application needs to route calls to specified destinations based on the telephone numbers (which can be either the calling numbers or the called numbers as desired). In particular, the routing instructions are applied to the telephone numbers on a best-pattern matched basis. An example is shown as follows:

| | |
|---|---|
| 1* | Routed to Destination A |
| 12* | Routed to Destination B |
| 1555* | Routed to Destination C & D |
| 1555403* | Routed to Destination E |
| 1555408* | Routed to Destination F |

The above list shows that different routing instructions are assigned to different keys on a best-pattern matched basis. The symbol "*" is a "wild card" that represents any possible number(s) in the keys.

FIG. 2 substantially reproduces the data in the list above. FIG. 2 shows records, in the form of routing instructions to specified destinations, that may be associated with respective keys using a method in accordance with an embodiment of the present invention.

According to the above routing instructions, all calls with starting numbers "1555408" are to be routed to Destination F. All calls with starting numbers "1555403" are to be routed to Destination E. All calls with starting numbers "1555" except "1555403" and "1555408" are to be routed to Destination C and D. All calls with starting numbers "12" are to be routed to Destination B, and all calls with a starting number "1" except those with starting numbers "12" or "1555" are to be routed to Destination A.

Routing instructions for an exemplary list of telephone numbers are as follows (with best-pattern matched keys shown in bold):

| | |
|---|---|
| 17325556666 | Routed to Destination A |
| 18002223333 | Routed to Destination A |
| 15554031111 | Routed to Destination E |
| 15551002000 | Routed to Destination C & D |
| 15554082222 | Routed to Destination F |
| 12013334444 | Routed to Destination B |

Thus, for a given telephone number, the desired routing instruction is the one for the key that best-pattern matches the telephone number. In this particular embodiment, a key that is a "best-pattern match" of a telephone number is the key which has a maximum number of the same starting digits as the telephone number. For example, a best-pattern matching key to the telephone number "15554082222" is the key "1555408" but not the key "1555" or "1555403" in the above list, because the key "1555408" has seven digits that match the starting digits in the telephone number "1555408222", while the other two keys have only either four or six digits that match the starting digits of the telephone number "1555408222".

More generically, in an exemplary embodiment of the present application, a key that is a "best-pattern match" of a data string means that the key has a maximum number of the same digits of the data string. Such digits may not be starting digits of the data string, but can be any predetermined ones. For example, the digits may start from the last digit in the telephone number. If the data string is a person's name, the digits can be either the first name or the last name, or even can be a predetermined combination of them. For example, it can be the first letter of the first name followed by the full last name, such as commonly used in email address. The data string may be set up with multiple fields in such a way that any desired combination of fields is used for the pattern matching procedure.

In order to associate the above desired routing instructions with keys so that a query to the database can be carried out efficiently on a best-pattern matched basis, an indexing technique according to the present invention is explained in detail below.

As schematically illustrated in FIG. 1, the tree-like indexing technique comprises a plurality of levels 101-107, and each level represents a digit in the keys. Each key represents a group of telephone numbers to which it is a best-pattern match. In this embodiment, each key comprises one or more starting digits of the telephone numbers of one group.

The sequence of the levels 101-107 corresponds to a sequence of the digits in the keys. In this embodiment, the sequence is a natural order of the digits in the keys which corresponds to the starting digits of their best-pattern matched telephone numbers. More specifically, as shown in FIG. 1, the first level 101 represents the first digit (the starting digit) in a telephone number, the second level 102 represents the second digit, the third level 103 represents the third digit, and so forth.

At each level, an indexing instruction is provided for each possible constituent element (i.e., one of numbers 0-9) of the keys at the digit represented by this level. This indexing instruction may be one of the following four types:

i) moving on to check a next level without specifying a record, such as the instructions for element "5" at levels 102 and 103, element "4" at level 105, and element "0" at level 106;

ii) specifying one or more records, and moving on to check a next level, such as the instructions for element "1" at level 101 and for element "5" at level 104;

iii) specifying one or more records, and NOT moving on to check a next level, such as the instructions for element "2" at level 102 and elements "3" and "8" at level 107; and iv) NOT specifying a record, and NOT moving on to check a next level, such as instructions for all other elements in levels 101~107 not mentioned above, e.g., elements "0" and "2" to "9" at level 101.

With the indexing technique of FIG. 1, the routing instructions (records) can be indexed with the keys in a best-pattern matched basis. Thus, when the telephone application receives a call, it can quickly lookup the database to find the routing instructions specified for a key that best-pattern matches the telephone number in the call.

Such a lookup process comprises the steps of: i) starting sequentially from a first level of the indexing technique, checking for an instruction for each constituent element of the telephone number at each digit represented by each level, and moving on to check a next level until the instruction found at a lastly checked level does not comprise an instruction of moving on to check a next level; and ii) if the instruction found at the lastly checked level specifies one or more records, returning the specified records as a result of the lookup process, otherwise backing up one level at a time until an instruction of specifying one or more records is found, and returning the specified records as a result of the lookup process.

For better understanding the above lookup process, below is a detailed explanation for above-listed various telephone numbers as exemplary queries for the routing instructions that have been indexed according to the indexing technique in FIG. 1.

Take a telephone number "17325556666" as the first example. After the telephony application receives the call, it starts the lookup process. First, it checks the first level 101 for an instruction for the element "1" at the first digit. An instruction for element "1" is found asking the lookup process to move on to check a next level. Thus, the lookup process moves on to check the second level 102 for an instruction for the element "7" at the second digit. The instruction for element "7" at the second level does not ask for moving on to check a next level, so the lookup process does not move on to a next level. The instruction for element "7" does not specify a routing instruction either, so the lookup process backs up a level to the first level 101, where an instruction for element "1" is found to specify that the call shall be routed to Destination A. Thus, the result of the lookup process is the routing instruction to route the call with telephone number "17325556666" to Destination A. Similar process and result are applicable to the telephone number "18002223333".

If the telephone number is "12013334444", first the telephony application checks the first level 101 for an instruction for the element "1" at the first digit. An instruction for element "1" tells that the lookup process shall move on to check a next level. Thus, the lookup process moves on to check the second level 102 for an instruction for the element "2" at the second digit. An instruction for the element "2" specifies a Destination B, but does not ask for moving on to check a next level. Thus, the routing instruction for the telephone number "12013334444" is determined as Destination B.

For telephone number "15551002000", the instruction found in the first level 101 asks for moving on to check a next level, so the lookup process checks the second level 102 for instructions for element "5" at the second digit. The instruction for element "5" at the second level asks moving on to check a next level, so the lookup process goes on to the third level 103 for instruction for element "5" at the third digit, which is found to also ask for moving on to check a next level. So the lookup process keeps moving on to the fourth level 104 for instructions for element "5" at the fourth digit. The instruction for the element "5" at the fourth level 104 also asks for moving on to check a next step. Thus, the lookup process goes on to check the fifth level 105 for instructions for element "1" at the fifth digit in the telephone number. The instruction for element "1" at the fifth level 105 does not ask for moving on to check a next step, and does not specify a routing instruction either. Thus, the lookup process backs up one level to fourth level 104, where it finds the instruction for element "5" at fourth level 104 specifies routing destinations C and D. Thus, the routing instruction for the telephone number "15551002000" turns out to be Destinations C and D.

For telephone number "15554031111", the lookup process has starting steps similar to those for the telephone number "15551002000", until it finds an instruction at the fifth level 105 for element "4" asking for moving down to check a next level. The lookup process thus goes down to check the sixth level 106 for element "0" at the sixth digit in the telephone number. Similar to that in the fifth level 105, the instruction for element "0" in the sixth level 106 asks for moving on to check a next level. Thus, the lookup process moves on to the seventh level 107, which is the last level in this embodiment. The instruction for element "3" at the seventh digit in the telephone number is found to specify a destination E. Thus, the destination E is the routing instruction for telephone number "15554031111". The same process is applicable to telephone number "15554082222", except that the instruction for element "8" in the last level 108 specifies a destination F but not E.

Therefore, the performance of the best-pattern matched lookup process only depends on the maximum number of digits to be searched, and is independent of the total phone numbers in the database. Thus, no matter how many records are there in the database, the algorithm search time to do a best-pattern match lookup remains the same. As a result, not only is the search extremely fast, but the application can scale to any number of records. Moreover, expensive sorting is not required if new records are added to the indexing technique.

It is also possible to automatically provide for the returned list of routing destinations to be in a prioritized order. More specifically, as the method "backs out" as described above, the list of destinations at each level may be returned before proceeding to the next level up. Such a technique will produce an ordered list of destinations, from most specific to least specific.

It is also noted that the algorithm may be implemented in a recursive fashion, wherein one instruction is issued that specifies under which conditions to move to the next level of search. Since the algorithm at each level is effectively the same, recursive implementation is straightforward and efficient.

Though the indexing technique of the present invention is described above with the telephone numbers and routing instructions as exemplary keys and records, it shall be understood that the present invention is applicable to any database where a best-pattern match lookup is desired. The keys may represent any kind of data entries, and may comprise any alphanumeric characters but not only numbers. For example, the keys can represent person's names, product names, etc. Similarly, it is possible to sort using multiple fields in a manner similar to that used for data strings to efficiently perform searches of greater complexity using the field as the data element and thereby search in such a way that any desired combination of fields is used for the pattern matching procedure. A combination of fields and data strings can be used, nested at any desired level of complexity. Moreover, the routing instructions can be any type of call processing instructions or operation commands.

The present invention is also applicable in Internet routing and voice over the Internet (VOIP) systems. It is known, for example, to route telephone calls over the Internet to and from "gateways", devices that interface between various types of networks. In an embodiment of the present invention, the particular gateway to which a call or other data is routed may be determined based upon the indexing techniques and methodologies described above. Additionally, the database utilized may be a traditional database, a modeled database, or any other type of data structure.

The scope of the present invention is intended to be solely defined in the accompanying claims, and is not to be limited to the various exemplary embodiments disclosed in the specification.

What is claimed is:

1. A method for associating a plurality of keys with respective predetermined records, each of said keys including a data string of one or more digits, said digits having a range of values, the method comprising:

(a) providing an index having a plurality of levels, wherein each said level corresponds to a respective digit of said keys, and wherein each said level is a data field including a plurality of elements having a range of values corresponding to the range of values of said digits of said keys;

(b) for each element of each said level of said index having a value matching the value of the key digit corresponding to that level, associating an indexing instruction therewith selected from the group of indexing instructions consisting of:
i) moving on to check a next level without specifying a record; ii) specifying one or more records and also moving on to check a next level; iii) specifying one or more records and not moving on to check a next level; and
(c) associating the following indexing instruction with all elements of the index other than the matching elements of step (b): iv) not specifying a record and not moving on to check a next level.

2. The method of claim 1 wherein each of said keys represents a group of telephone numbers.

3. The method of claim 2 wherein each of said keys is a specified portion of each telephone number of said group.

4. The method of claim 3 wherein said specified portion is a starting portion of said each telephone number of said group.

5. The method of claim 4 wherein said starting portion comprises one or more digits.

6. The method of claim 2 wherein said records are call processing instructions.

7. The method of claim 6 wherein said call processing instructions are routing instructions.

8. The method of claim 1 wherein said digits are alphanumeric characters.

9. The method of claim 8 wherein each of said keys represents a group of data entries of said database.

10. The method of claim 9 wherein each of said records is a destination assigned to said group represented by said each key.

11. The method of claim 1 wherein a sequence of said plural levels corresponds to a sequence of said digits in said data strings.

12. The method of claim 11 wherein said sequence of the digits is a natural order of the digits in the data string.

13. The method of claim 1 further comprising:
providing a data string query;
identifying a key of the plurality of keys having a best pattern match with the data string query; and
returning a record for said data string query associated with said best pattern matching key.

14. The method of claim 11 wherein said sequence of the digits is determined by a specified priority of each digit in the data string.

15. The method of claim 1 further comprising:
providing a telephone number for making a telephone call;
identifying a key of the plurality of keys having a best pattern match with the telephone number;
returning a record specified for the key having the best pattern match, the record including a routing instruction for the telephone call; and
routing the telephone call to a destination in accordance with the routing instruction.

16. A method for associating a plurality of keys with respective predetermined telephone call routing instructions, each of said keys including a data string of one or more digits, said digits having a range of values, the method comprising:
(a) providing an index having a plurality of levels, wherein each said level corresponds a respective digit of said keys, and wherein each said level is a data field including a plurality of elements having a range of values corresponding to the range of values of said digits of said keys;
(b) for each element of each said level of the index having a value matching the value of the key digit corresponding to that level, associating an indexing instruction therewith selected from the group of indexing instructions consisting of:
i) moving on to check a next level of the index without specifying a routing instruction; ii) specifying one or more routing instructions and also moving on to check a next level of the index; iii) specifying one or more routing instructions and not moving on to check a next level of the index; and
(c) associating the following indexing instruction with all elements of the index other than the matching elements of step (b): iv) not specifying a record and not moving on to check a next level;
identifying a key of the plurality of keys having a best pattern match with a given telephone number;
returning a routing instruction specified for the key having the best pattern match; and
routing the telephone call to a destination in accordance with the returned routing instruction.

17. An indexing system for associating a plurality of keys with respective predetermined records, each of said keys including a data string of one or more digits, said digits having a range of values, the system comprising:
(a) an index having a plurality of levels, wherein each said level corresponds a respective digit of said keys, and wherein each said level is a data field including a plurality of elements having a range of values corresponding to the range of values of said digits of said keys, the levels of the index being linked by indexing instructions;
(b) an active indexing instruction, of said indexing instructions, associated with each element of each said level of said index having a value matching the value of the key digit corresponding to that level, the indexing instruction being selected from the group consisting of:
i) moving on to check a next level of the index without specifying a record; ii) specifying one or more records and also moving on to check a next level of the index; iii) specifying one or more records and not moving on to check a next level of the index; and
(c) a null indexing instruction, of said indexing instructions, associated with all elements of the index other than the matching elements of (b), the final indexing instruction specifying: not specifying a record and not moving on to check a next level.

* * * * *